March 17, 1964  O. A. BECKER  3,125,041
FILING DEVICE

Filed March 3, 1961  8 Sheets-Sheet 1

INVENTOR
OTTO ALFRED BECKER
BY
OSTROLENK, FABER, GERB & SOFFEN
ATTORNEYS

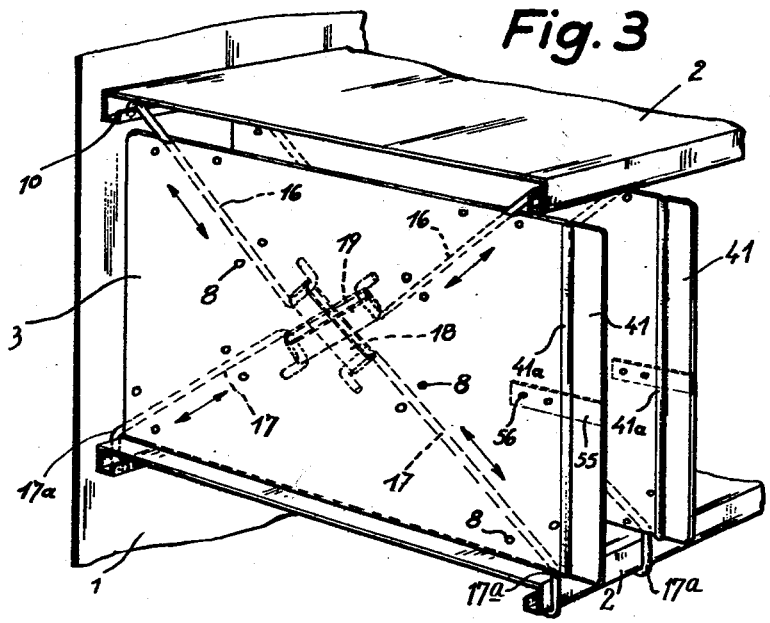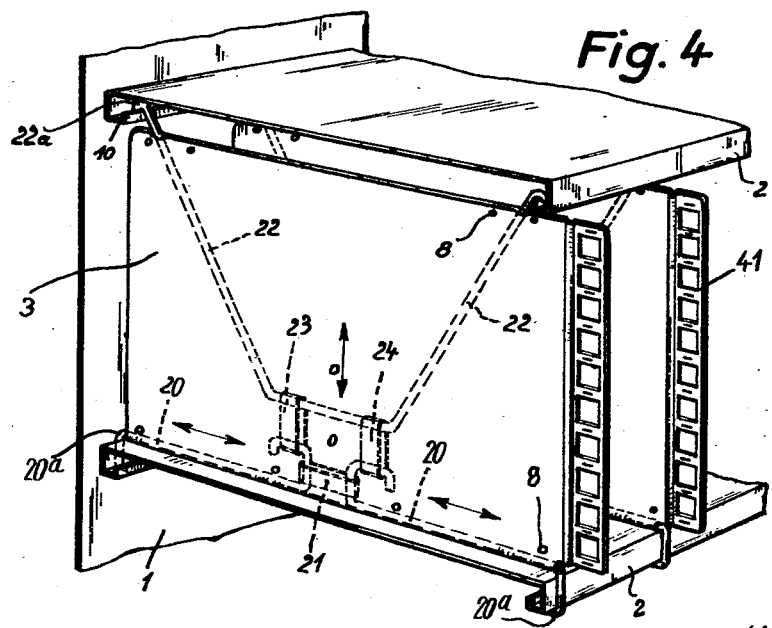

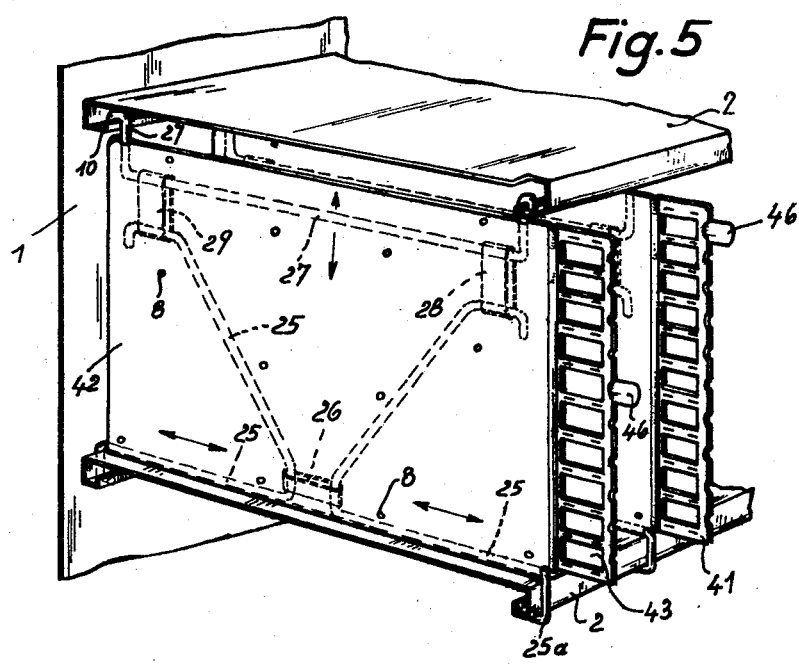
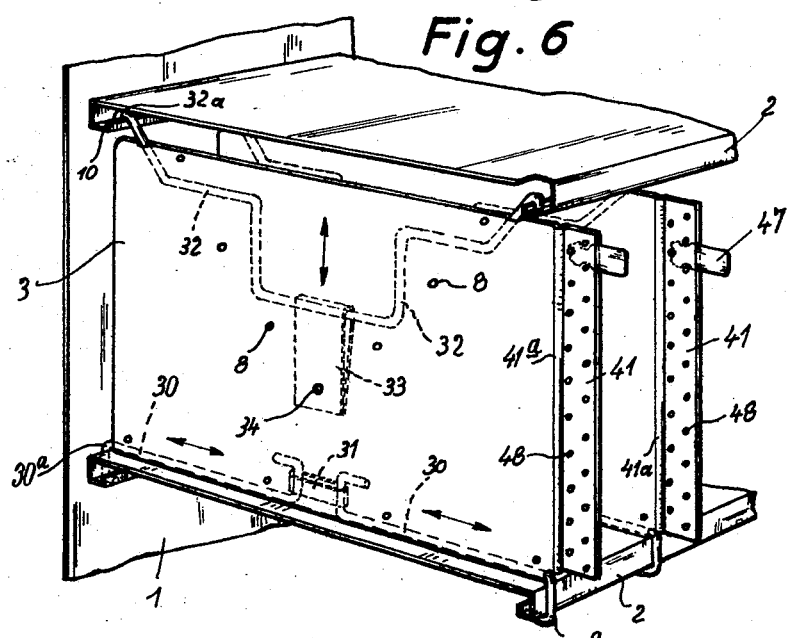

March 17, 1964   O. A. BECKER   3,125,041
FILING DEVICE

Filed March 3, 1961   8 Sheets-Sheet 4

INVENTOR
OTTO ALFRED BECKER

BY
OSTROLENK, FABER, GERB & SOFFEN
ATTORNEYS

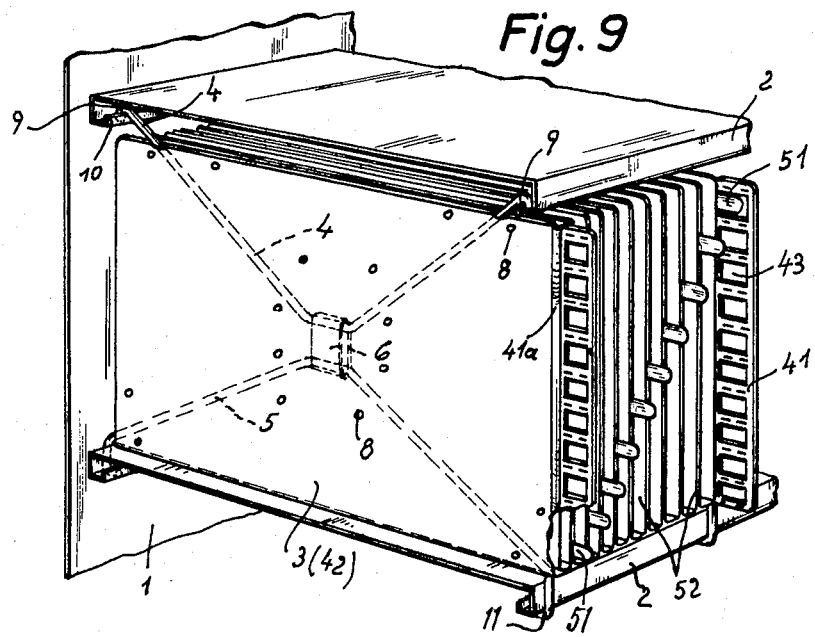
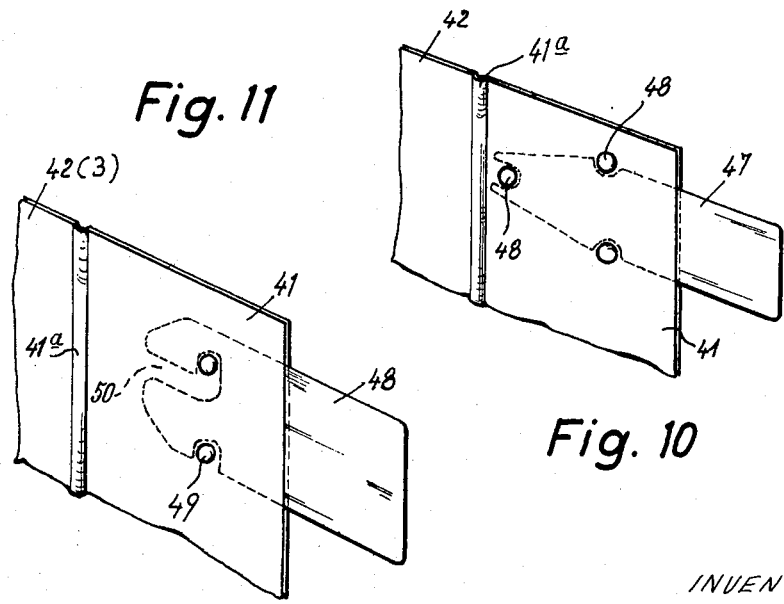

March 17, 1964  O. A. BECKER  3,125,041
FILING DEVICE
Filed March 3, 1961  8 Sheets-Sheet 7
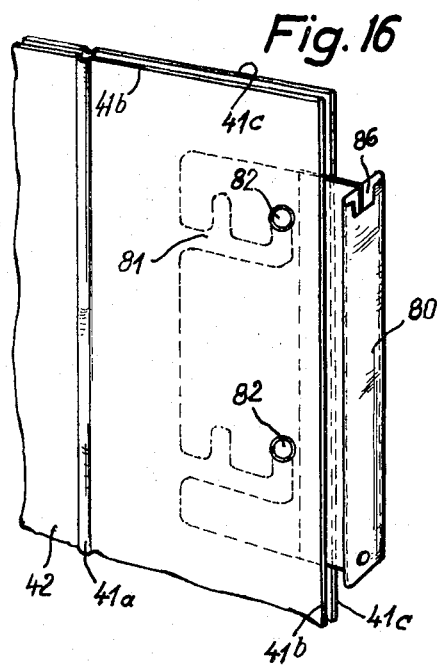
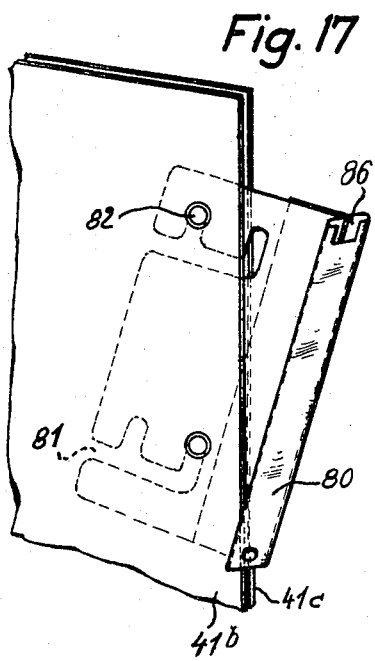
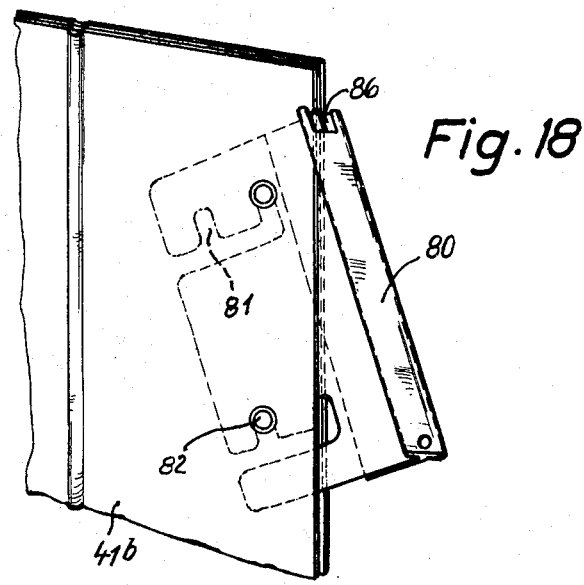
INVENTOR
OTTO ALFRED BECKER
BY
OSTROLENK, FABER, GERB & SOFFEN
ATTORNEYS March 17, 1964  O. A. BECKER  3,125,041
FILING DEVICE Filed March 3, 1961  8 Sheets-Sheet 8

INVENTOR
OTTO ALFRED BECKER
BY
OSTROLENK, FABER, GERB & SOFFEN
ATTORNEYS

United States Patent Office 3,125,041
Patented Mar. 17, 1964

3,125,041
FILING DEVICE
Otto Alfred Becker, 59 Robert-Koch-Str.,
Saarbrucken 6, Germany
Filed Mar. 3, 1961, Ser. No. 93,231
12 Claims. (Cl. 108—60)

The invention relates to improvements in vertical partitions which are used in filing cabinets and extend transversely to the plane of the shelves and between the same. Partitions are known which consist of metal or cardboard and, e.g., the upper parts of which are attached with resilient means to upper slide rails whereas the opposite lower end is hook-shaped and interengages with the shelf.

This arrangement of resilient means requires additional space over the papers to be filed, which must not contact the overlying resilient means during insertion. Besides, it is difficult to hang the loose hook portion of the resilient means into the slide rails.

For this reason, the invention provides various wire supports, which directly carry the end hooks and are disposed within sheetlike sheaths, e.g., of cardboard, the necessary tension being applied by resilient means which are disposed and preferably concealed inside the sheaths. As a result, the hook-shaped ends have in each case that position which corresponds to the position of the slide rails or of the longitudinal edges of the shelf so that they can easily and quickly be attached thereto and the necessary tension can be created at the same time. In this case, the tension acts in such a direction that the hook-shaped ends are firmly urged against the shelf or the slide rails. At the same time, the space between the shelves can be utilized throughout its height for the papers to be filed, the suspension means requiring no additional space.

The invention relates further to a substantial expansion of the function of partitions. The same are formed in their protruding part as a register for the registration of papers, drawings and the like filed between them. For this purpose, the protruding part of the partition is hinged to facilitate the insertion of the bags, folders or the like which contain the papers and has, e.g., window openings on both side faces. Register sheets bearing inscriptions, marks or the like can be inserted behind these window openings from the front edge between the two wall elements of the partition. Each register sheet may comprise one or more replaceable inscription lines or strips defined by perforations. In the latter case, one line is provided for each bag and, e.g., free lines may be left out to enable the subsequent insertion of supplements. The register strips may be replaced as desired.

When supplements are inserted, e.g., in an alphabetical order, reference numbers for each bag will be added, e.g., at the end of the line, to the alphabetic references to indicate the group and the tab position. The existing groups with their tabs will then remain unchanged.

The bag which will be alphabetically marked on the register sheet will always be arranged as the last bag of the associated group of bags. Its tab will be given the next echelon position of the group. If this echelon is complete, a new echelon will be begun which has the same group color or another group symbol.

Since each group will always have two registers (at the beginning and end) for, e.g., 10 bags and each register sheet has free register strips, there is ample space for supplements. If this space is not sufficient, an additional register partition, e.g., of the same group-indicating colour may be arranged behind the last bag. The replaceable register strips are applied to this additional partition in strictly alphabetical order. Behind and between these register sheets or strips, signals or the like which protrude beyond these sheets or strips may be inserted to indicate main groups etc. The bags may be provided with tabs arranged in echelon in groups and the register strips may carry for each word indication the appertaining reference numeral of the tab corresponding to its echelon position. In this case, it is not necessary for the bags, folders and the like filing units to carry the known label carriers which extend at right angles at their front edge. This results in a further reduction in the cost of these bags or the like and much space is saved in a lateral direction, which space would otherwise be required because the bags or the like must have a minimum thickness for the label carriers, arranged one beside the other, even when the bags are empty. The tiring vertical reading is also eliminated.

Further advantages result from the predetermined use of various symbols, such as various colors, for the protruding parts of the partitions or for the insertable register sheets or strips, in conjunction with predetermined symbols such as color sequences of the bags and their tabs. For instance, the color sequences of the partitions may afford a visual indication of groups of ten, e.g., green partitions marked 1 to 10, yellow ones 11 to 20, blue ones 21 to 30, red ones 31 to 40 etc. The color of the tabs of the bags may agree with these colours of the appertaining partitions and the color of the bag may indicate groups of one hundred; e.g., green bags may be used as bags 1 to 100, yellow ones as 101 to 200, blue ones as 201 to 300 etc. To indicate groups of one thousand, e.g., the register strips of the partitions may be provided in corresponding colors, e.g., light green strips for 1 to 1000, yellow strips for 1001 to 2000, blue strips for 2001 to 3000. Alternatively, the bags may carry additional signals, e.g., in corresponding colors, at the front edge. Further, the tabs may be provided, e.g., with round stickers in a color corresponding to the groups of one thousand or may have different recesses, indentations or the like. Many modifications are possible.

As is apparent from this example, predetermined groups of signals, e.g., groups of colors, are formed in a uniform sequence, which are used for certain parts of the filing device, and together form a uniform and definite filing system. As a result, there is only one specific position for each bag and this position cannot be confused with others. This enables quick, highly efficient work. The file is arranged in a space of very small height and width. It is obvious that the supporting partitions may be replaced by loosely inserted partitions having protruding front parts designed as register carriers for separating and indicating the groups of bags.

Further advantages and details of the invention will become apparent from the following description of illustrative embodiments with reference to the accompanying drawings, in which FIGS. 1 to 7 are perspective views showing various support wire arrangements according to the invention.

FIG. 9 is a perspective view showing the arrangement of several paper bags between two partitions provided with suitable identifications, FIGS. 10 and 11 are perspective views showing on an enlarged scale the provision of signals on the partitions according to the invention.

FIGS. 16 to 18 show a label carrier according to the invention in three different positions.

Figure 1:
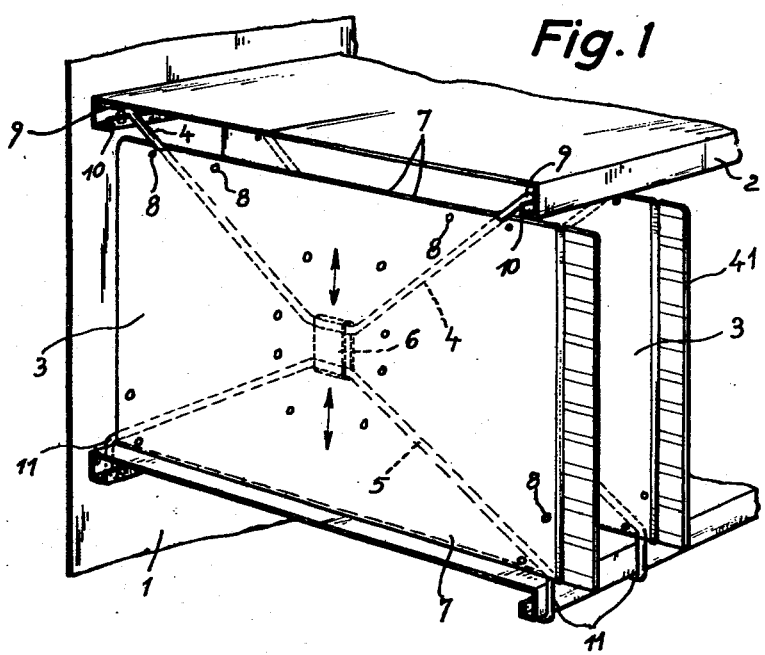

FIG. 1 is a perspective view showing a file cabinet 1 having shelves 2, between which partitions 3 are arranged which comprise displaceable support wires 4 and 5. These wires are tensioned by a rubber loop 6 and are covered on both sides by carton sheets 7, which are held by means of rivets 8 in the desired position relative to the support wires. The rivets 8 are arranged so as to enable a displacement of the support wires.

The upper support wire 4 has two hook-shaped outer ends 9, which engage slide rails 10 of the shelf 2 and are displaceable in the longitudinal direction. The lower support wire 5 has correspondingly larger hook-shaped ends 11 embracing the outer longitudinal edges of the lower shelf 2. The two upper hook-shaped ends and the two lower ones are pulled toward each other by the vertical rubber loop 6.

Figure 2:
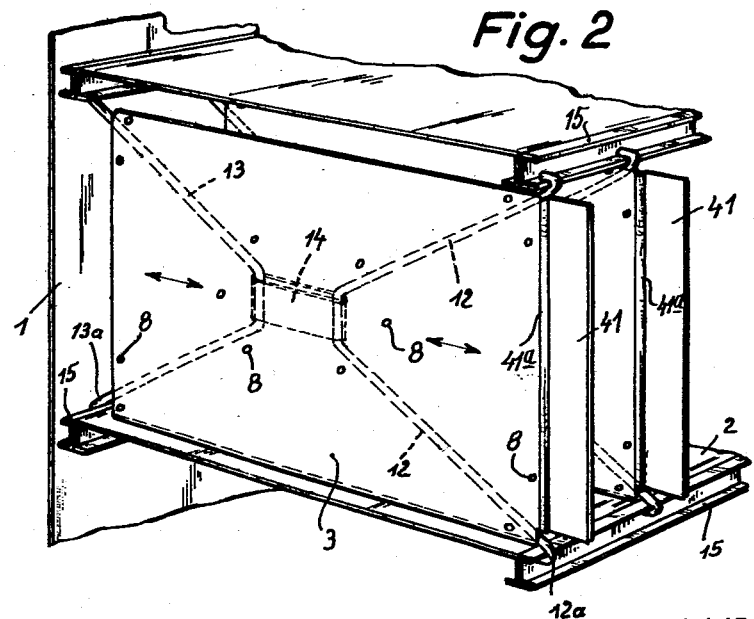

FIG. 2 shows a modification of FIG. 1. The pair of displaceable support wires 12 and 13 are so designed that each support wire has an outer end engaging the upper shelf and an outer end engaging the lower shelf and both support wires are connected and tensioned in a horizontal direction by a rubber loop 14. The longitudinal sides of the shelves 2 are provided with U-shaped rails 15 for receiving the hook-shaped end of the supports.

FIG. 3 is a perspective view showing a further embodiment, in which each of the support wires 4 and 5 (FIG. 1) is divided into two elements 16, 16 and 17, 17 respectively, each of which carries an outer end hook. The elements are interconnected by two rubber loops 18 and 19, e.g., to form a cross.

FIG. 4 is a perspective view showing a further modification. The lower support wire is divided into two elements 20 which have hooked ends 20a and are displaceable in the longitudinal direction and held together by a rubber tape 21. Above the lower wire, a support wire 22 is arranged with hook ends 22a, which is connected by rubber loops 23 and 24 to the hook-shaped inner ends of the support wire elements 20. As in all illustrative examples, the direction of the arrows indicates the direction in which the support wires are displaceable.

FIG. 5 is a perspective view showing a further embodiment, in which the longitudinally displaceable lower support wire elements 25 having hooked ends 25a and held together by a rubber loop 26 are connected by rubber loops 28 and 29 to a vertically displaceable upper support wire 27.

FIG. 6 shows another embodiment, which comprises also a lower support wire 30 having two horizontally displaceable elements held together by a rubber loop 31. Above the lower wire, a vertically displaceable support wire 32 is disposed, which is held by a rubber loop 33 connected at its lower end to the partition by a rivet 34. The insertion of the support wire 32 into the upper slide rails will tension this rubber tape to exert tension on the ends 30a of the support wire 30, which ends embrace the shelf 2.

Figure 7:
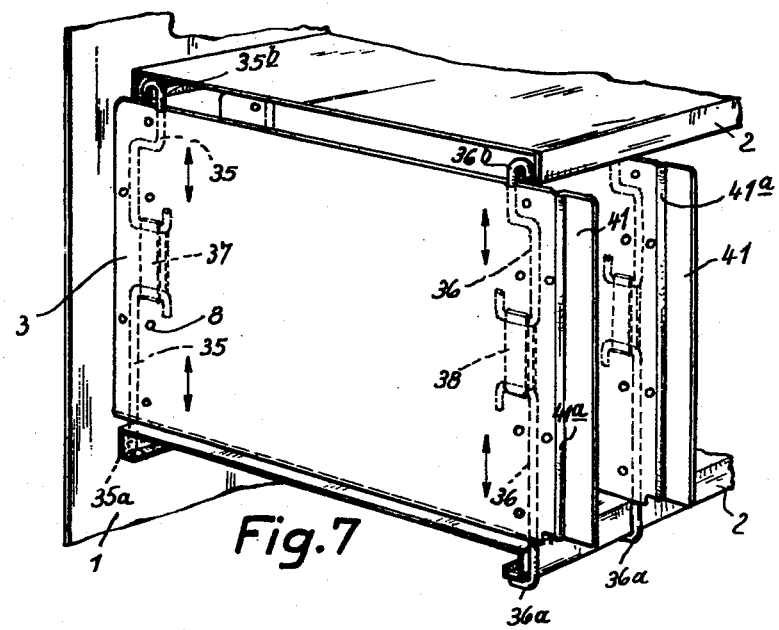

FIG. 7 is a perspective view showing vertically extending support wires 35, 36, which are divided each into two elements having hooked ends 35a, 35b, 36a, 36b and are held together by rubber loops 37 and 38.

Figure 8:
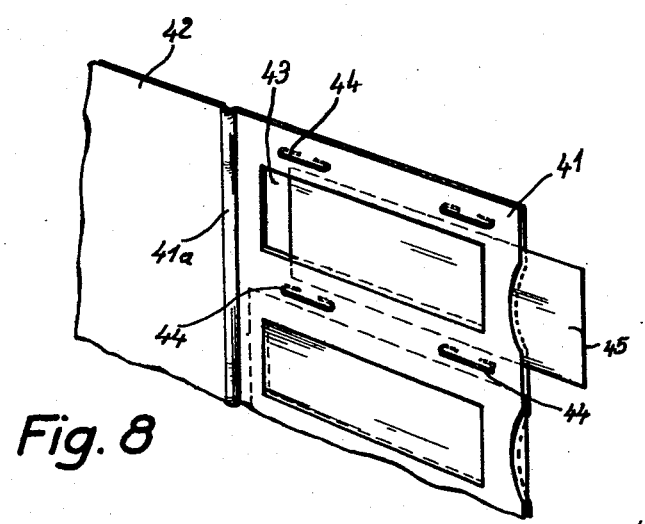
FIG. 8 is a perspective view showing on a larger scale the window openings provided according to the invention in a hinged partition part.

FIG. 8 shows the front part 41 of a partition 42 having a hinge 41a (or 3) and window openings 43. Further provided are upper and lower limiting and guiding staples 44 for a register sheet 45, which is horizontally insertable into the double-walled front part. The window openings 43 may be provided on both sides and it is possible to insert two register sheets 45. As a means for subdividing the inscriptions to be provided, these windows may be replaced by suitable embossed recesses, imprints (FIG. 1) and the like or inscription-bearing stickers may be applied to the several fields.

To ensure the return of the laterally pivotally movable, hinged, protruding parts 41 of the partitions 3 (or 42), into the plane of the partition, resilient means may be provided which extend across the hinge 41a as is shown in FIG. 3. These resilient means may consist, e.g., of spring leaves 55 or the like and may be secured with rivets 56 or otherwise to or in the partitions.

Further register means, such as signals 46 (FIG. 5) or the like, of different form and color and with different identifications, such as numerals or letters etc., may be inserted between the register sheets 45 and may protrude, e.g., beyond the front edge of the protruding part 41.

The partitions 3 (or 42) as well as the register sheets 45 may be provided with specific colors which differ from each other in a predetermined and distinguishing manner. According to FIG. 9, the protruding parts 41 or the register sheets 45 may be provided with reference numbers, which refer to tabs 51 arranged in echelon on the front edges of the bags 52 arranged between two partitions 3. The reference numeral indicates the position of the corresponding tab 51 relative to the other tabs arranged in echelon. The tabs are preferably arranged in echelon in groups of ten and ten window openings 43 and register sheets 45 are provided. Equal color sequences may be provided for certain register elements, e.g., for the partitions 3 (or 42) themselves or the register sheets 45, the filing bags 52 or the like, the bag tabs 51, the signals 46 etc. An example of a color sequence is green, yellow, blue, red etc. This will enable the identification of certain groups, e.g., numerical groups, such as tens, hundreds, thousands, etc. It may be suitable to indicate the units by the tabs 51 arranged on the bags one over the other in echelon. Reference numbers provided, e.g., on the register sheets 45 or the protruding parts 41 of the partitions may indicate the positions of the tabs arranged in echelon in groups of ten.

The register sheets may also be provided with inscriptions in a strictly alphabetical order, e.g., with names, all groups carrying only reference numbers from 1 to 10 and supplements and tabs (or bags) having the same color as the partition being inserted before the next different color group (beginning with 1). When a certain color sequence for tab groups (1 to 10), such as green, yellow, blue, red, etc., is exhausted, it may be repeated if these repetitions are used in conjunction with a different color of the bags which may also be used, e.g., in the color sequence green, yellow, blue, red, etc.

Equal color sequences may also be used for certain register elements to identify certain recurring groups, such as subject groups, groups of persons, geographical groups, other groups or the like. In this case, the various types of register elements marked by different colors having a predetermined significance constitute a definite filing system, in which all elements are interrelated.

FIG. 9 shows an arrangement of ten filing bags 52 having ten tabs 51 arranged in echelon and disposed between two partitions 3 (or 42), each of which has ten inscription-bearing or register strips 45 arranged behind ten window openings 43 of the hinged front parts 41.

FIG. 10 shows the arrangement of a signal 47 formed with recesses at its insertable end. These recesses are arranged to interengage with rivets 48 to retain the signal in a horizontal position (see FIG. 6).

FIG. 11 shows a modified embodiment, in which the insertable end 50 is recessed like a bayonet joint and is held in its final position by two rivets 49.

Figure 12:
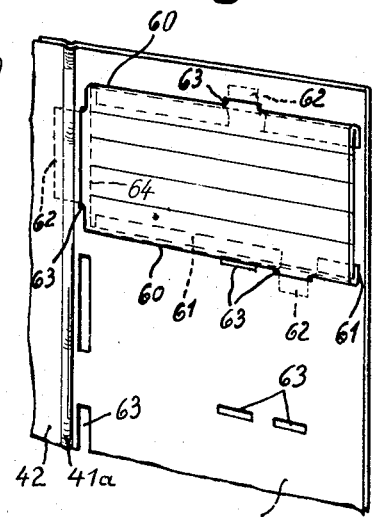

FIG. 12 is a perspective view showing the front part 41 of a partition 42. This front part is provided with a transparent receiving means 60 having horizontal guide channels 61 and extensions 62 which can be inserted into slots 63 formed in the part 41. Register sheets 64 can be inserted into this receiving means 60 from the front end thereof. These register sheets are divided by perforations into replaceable inscription-bearing strips.

Figure 13:
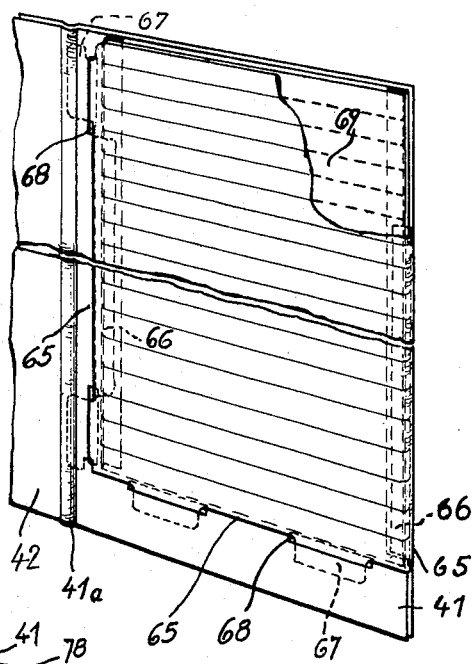
FIGS. 12 and 13 are perspective views showing two different embodiments of transparent receiving means according to the invention arranged on a partition.

FIG. 13 shows a modification of FIG. 12. A transparent receiving means 65 has vertically extending guide channels 66 and extensions 67, which engage slots 68 formed in the front part 41 of the partitions 42. The front guide channel 65 embraces the open front edge of the part 41. A register sheet 69 divided into strips by perforations can be inserted from the top or may be laid into the receiving means 65 when the same has been removed.

Figure 14:
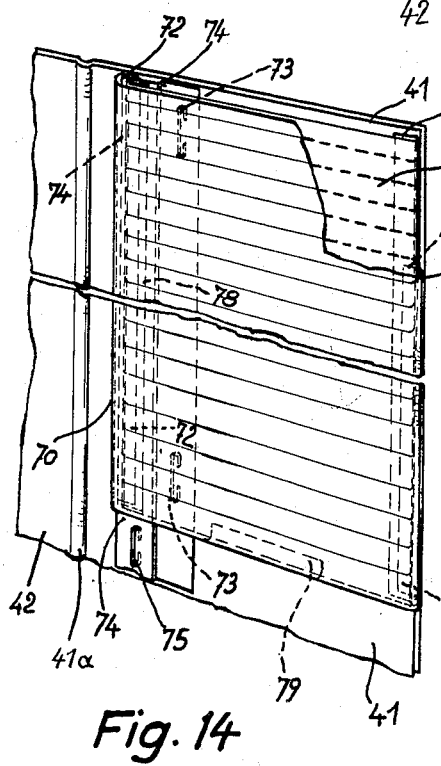
FIG. 14 shows a modification of FIG. 13.

FIG. 14 shows a modification of FIG. 13. A transparent receiving means 70 has a vertical front guide channel 71, which embraces the front edge of the protruding part 41 of the partition 42, whereas the rear guide channel 72 embraces the rim of a guide strip 74, which is secured with tacking stitches 73 to the protruding part. A tacking stitch 75 at the lower end of the strip 74 closes and locks the same so that the receiving means 70 and its guide channel 72 cannot slide further downwardly.

A register sheet 76 divided by perforations into register strips 77 and having folded lateral edges 78 is inserted in the receiving means. To prevent the register sheet from falling off, a portion 79 of the lower edge of the receiving means is folded inwardly.

Figure 15:
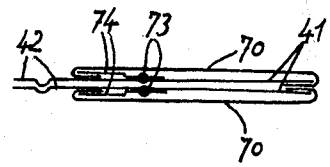
FIG. 15 is a sectional view showing a detail of FIG. 14.

FIG. 15 is a transverse sectional view showing the arrangement of the receiving means 70 on both sides of the double-walled partition 42 or of the protruding part 41.

FIGS. 16 to 18 show a label carrier 80 inserted between the outer walls 41b and 41c of a double-walled partition or the like (or bag wall) which is open in front. This label carrier 80 is shown in FIGS. 16 to 18 to be detachably secured in three differential positions, which are attained by pushing suitable cut-out portions 81 of the label carrier onto two rivets 82, which interconnect the two outer walls 41b and 41c of the protruding part 41. Different positions will be obtained depending on the combination of the cut-out portions 81.

Figures 19, 20:
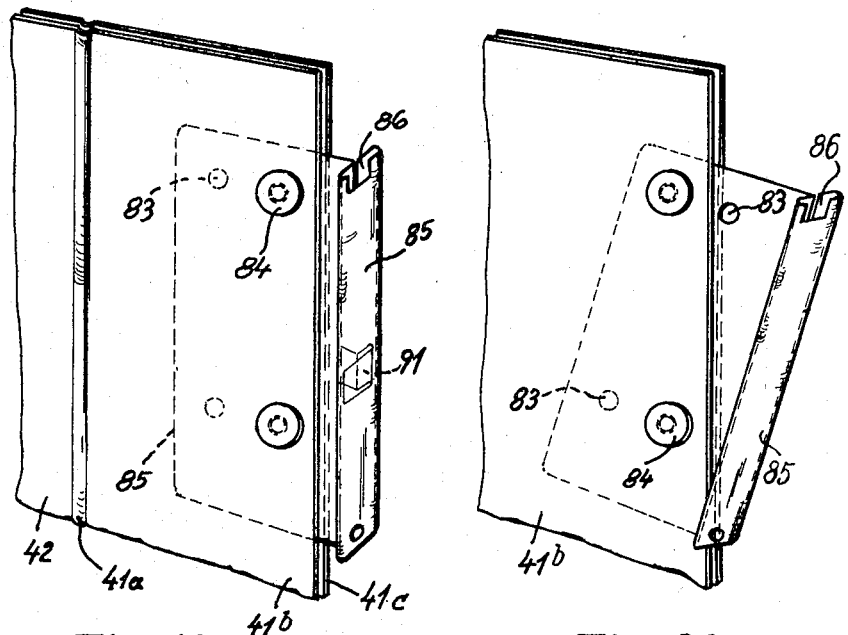
FIGS. 19 and 20 show an additional arrangement of a label carrier according to the invention in two possible positions.

As is shown in FIGS. 19 and 20 the cut-out portions may be replaced by holes 83 and the rivets may be replaced by inwardly directed snap fastener elements secured to the outer walls 41b and 41c and extending through the holes 83 to detachably secure the label carrier 85 in different positions of different inclination depending on the selection of the holes.

To facilitate the insertion of signals or signal and label strips, the label carrier shown in FIGS. 16 to 20 have in their upper part a forwardly open cut-out portion whereas the folded rear parts remain unchanged. This is of special significance for insertable signal strips 87, in which the replaceable signals 88 have extensions 89 extending downwardly into recesses 90 so that an insertion in the direction opposite to the direction of these extensions 89 is complicated unless the front wall is removed at the top at 86 where the label carrier is introduced.

Figures 21, 22:
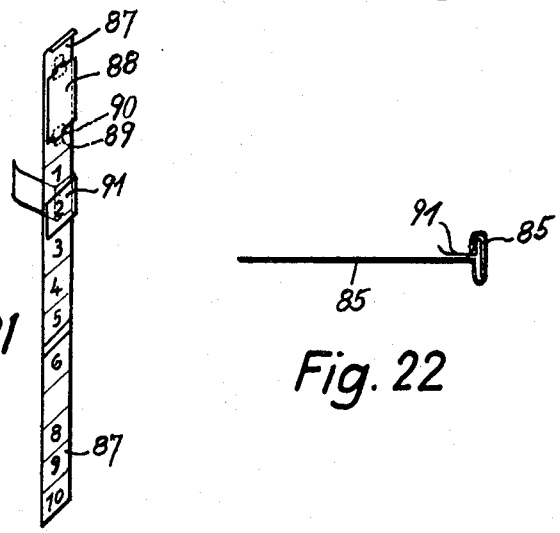
FIG. 21 shows a deadline strip according to the invention and FIG. 22 is a sectional view of the structure shown in FIG. 21.

FIG. 21 shows a deadline strip 87 in conjunction with a transparent runner 91 which may be, e.g., colored, and a replaceable upper signal 88. Depending on the color of the upper signal, the numerals 1 to 10 relate, e.g., to the first, second or third decade of a month, such as first decade=green upper signal; second decade=yellow signal; third decade=blue signal.

If the third decade is applicable and the transparent runner is in position "2," it will indicate the 22nd day of the month concerned.

An additional signal may also be used for indicating the month.

With this arrangement of signals, runners and numeral strips, any date to be observed in connection with the contents of a group of bags can be indicated within a small area. The individual bags to which, e.g., the deadline or another indication relates, are identified by signals or the like marks.

I claim:
1. A filing device comprising
   (a) a vertical back support;
   (b) at least two vertically spaced, horizontally extending shelves carried by said support, each of said shelves comprising two guiding means extending parallel to said support and to said shelves along the front and rear portions thereof;
   (c) a plurality of vertical partitions extending between said shelves and transversely thereof, each of said partitions comprising two interconnected slightly spaced parallel walls, first and second wire support members disposed between said walls and being slidable relative to said partition longitudinally thereof, each of said wire support members engaging at least one of said guiding means with at least one of its ends, and resilient means disposed between said walls for urging said wire support members into engagement with said guiding means to thereby maintain the partition in the vertical plane disposed for sliding movement in a direction parallel to said guiding means and transverse to said partitions.

2. The filing device as set forth in claim 1, in which each of said first and second wire support members is provided at its opposite ends with hooks, and in which said guiding means comprise slide rails carried by each of said shelves and disposed adjacent the front and rear edges thereof, said hooks engaging said slide rails to guide said partitions for sliding movement lengthwise thereof.

3. The filing device as set forth in claim 1, in which said guiding means comprise slide rails carried by each of said shelves and disposed adjacent the front and rear edges thereof; and in which at least one of said first and second wire support members comprises two elements, each of which elements is formed with an outer end hook engaging one of said slide rails, and resilient means for urging said elements toward one another.

4. The filing device as set forth in claim 1, in which each of said first and second wire support members is provided at its opposite ends with a pair of end hooks, and in which the end hooks of said first wire support members engage the guiding means disposed adjacent a first of said shelves and the end hooks of said second wire support members engage the guiding means disposed adjacent a second of said shelves adjacent to said first shelf.

5. The filing device as set forth in claim 1, in which each of said first and second wire support members is provided at its opposite ends with a pair of end hooks, and in which the end hooks of said first wire support members engage the guiding means disposed adjacent the front portions of a pair of adjacent shelves and the end hooks of said second wire support members engage the guiding means disposed adjacent the rear portions of said pair of shelves.

6. The filing device as set forth in claim 1, in which each of said wire support members comprises two elements, each of which elements is formed with an outer end hook engaging one of said guiding means of one of a pair of adjacent shelves; and including first resilient means for urging the element of said first wire support member engaging the guiding means disposed adjacent the front portion of a first of said pair of shelves toward the element of said second wire support member engaging the guiding means disposed adjacent the rear portion of the second of said pair of shelves, and second resilient means for urging the element of said first wire support member engaging the guiding means disposed adjacent the rear portion of said first shelf toward the element of said second wire support member engaging the guiding means disposed adjacent the front portion of said second shelf.

7. The filing device as set forth in claim 1, in which each of said first wire support members is provided at its opposite ends with a pair of end hooks engaging the guiding means disposed adjacent the opposite edge portions of one of a pair of adjacent shelves, and in which each of said second wire support members comprises two elements, each of which elements is formed with an outer end hook engaging one of the guiding means of the second of said pair of shelves, and including resilient means for urging said two elements of each of said second wire support members toward one another.

8. The filing device as set forth in claim 7, including resilient means associated with the spaced parallel walls of each partition for urging at least one of said first and second wire support members away from the guiding means with which it is associated to thereby urge said member into engagement with said guiding means.

9. The filing device as set forth in claim 1, in which each of said wire support members comprises two elements, each of which elements is formed with an outer end hook engaging one of said guiding means of one of a pair of adjacent shelves; and including resilient means for urging the elements of the first wire support member engaging the guiding means disposed adjacent the front and rear portions, respectively, of the first of said pair of shelves toward the corresponding elements of the second wire support member engaging the guiding means disposed adjacent the front and rear portions, respectively, of the second of said pair of shelves.

10. A filing device comprising:
   (a) a vertical rear support;
   (b) at least two vertically spaced, horizontally extending shelves carried by said support, each of said shelves carrying slide rails extending parallel to said support and to said shelves adjacent the front and rear edges thereof;
   (c) a plurality of vertical partitions extending between said shelves and transversely thereof, each of said partitions comprising
      (1) two interconnected, slightly spaced parallel walls, said walls terminating in a vertical front edge,
      (2) a double walled register extension hinged to the vertical front edge of said walls,
      (3) first and second wire support members disposed between said walls and being slidable relative to said partition longitudinally thereof, each of said wire support members engaging said slide rails with at least one of its ends, and
      (4) resilient means disposed between said walls urging the wire support members toward one another and into engagement with said slide rails, each of said partitions being thereby maintained in the vertical plane and simultaneously mounted for sliding movement in a direction parallel to said slide rails and transverse to said partitions.

11. The filing device as set forth in claim 10, in which said register extension on each said partition bears first indicating means and comprises locating means for engaging and locating said first indicating means; and including a group of filing units carried by said shelves between said partitions, each of said filing units having second indicating means corresponding to said first indicating means associated with the register extension of the adjacent vertical partition.

12. The filing device as set forth in claim 11, in which each said group of filing units is arranged in a predetermined sequence with the individual filing units of each said group also arranged in a predetermined sequence, and including register sheets carried by said partitions and bearing inscriptions, arranged in horizontal lines and relating to filing units and tabs carried by said filing units and arranged in echelon, each of said inscriptions comprising a reference to the position of the tab carried by the corresponding filing unit.

References Cited in the file of this patent

UNITED STATES PATENTS

| | | |
|---|---|---|
| 1,594,119 | Ritter | July 27, 1926 |
| 1,787,552 | Rice | Jan. 6, 1931 |
| 1,929,383 | Barker | Oct. 3, 1933 |
| 2,291,675 | Arelt | Aug. 4, 1942 |
| 2,500,309 | Dunham | Mar. 14, 1950 |
| 2,600,825 | Aigner | June 17, 1952 |
| 2,633,849 | Daniel | Apr. 7, 1953 |
| 2,839,203 | Becker | June 17, 1958 |
| 2,889,055 | Weller et al. | June 2, 1959 |